(12) United States Patent
Young

(10) Patent No.: US 11,698,874 B2
(45) Date of Patent: *Jul. 11, 2023

(54) SYSTEMS AND METHODS FOR GENERIC ASSURANCE FRAMEWORK

(71) Applicant: Verizon Patent and Licensing Inc., Basking Ridge, NJ (US)

(72) Inventor: Kristen Sydney Young, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,763

(22) Filed: Feb. 9, 2022

(65) Prior Publication Data
US 2022/0269625 A1  Aug. 25, 2022

Related U.S. Application Data

(63) Continuation of application No. 16/920,969, filed on Jul. 6, 2020, now Pat. No. 11,281,606.

(51) Int. Cl.
| G06F 13/20 | (2006.01) |
| G06F 13/40 | (2006.01) |
| G06F 16/95 | (2019.01) |
| G06N 20/00 | (2019.01) |
| H04L 67/10 | (2022.01) |

(52) U.S. Cl.
CPC .......... *G06F 13/20* (2013.01); *G06F 13/4004* (2013.01); *G06F 16/95* (2019.01); *G06N 20/00* (2019.01); *H04L 67/10* (2013.01)

(58) Field of Classification Search
CPC ...... G06F 13/20; G06F 13/4004; G06F 9/542; G06F 16/285; G06F 16/24568; H04L 67/26; G06N 20/00; G06N 20/20; G06N 7/005
See application file for complete search history.

(56) References Cited

U.S. PATENT DOCUMENTS

| 10,102,340 | B2 | 10/2018 | Tanner et al. |
| 10,645,181 | B2 * | 5/2020 | Hoffner .................. H04L 67/55 |
| 10,812,600 | B1 | 10/2020 | Naaman et al. |
| 2004/0267779 | A1 * | 12/2004 | Carter .................... G06F 16/36 |
| 2016/0034322 | A1 | 2/2016 | Braudes et al. |
| 2020/0183603 | A1 | 6/2020 | Takla et al. |
| 2020/0233877 | A1 | 7/2020 | Patel et al. |

* cited by examiner

*Primary Examiner* — Brian T Misiura

(57) ABSTRACT

Systems and methods enable data collection and analytics consumption with a generalized assurance framework using a message bus that supports a publish-subscribe model. A producer network element subscribes to a request topic on the message bus and posts, to the message bus, an announcement indicating a data topic is available from the producer network element. The producer network element receives via the message bus, the request topic including a request for the data topic and posts, to the message bus, records for the data topic in response to the request.

20 Claims, 9 Drawing Sheets

SYSTEMS AND METHODS FOR GENERIC ASSURANCE FRAMEWORK

CROSS-REFERENCE TO RELATED APPLICATION

This application is a continuation of U.S. patent application Ser. No. 16/920,969, filed on Jul. 6, 2020, and titled "Systems and Methods for Generic Assurance Framework," the contents of which are incorporated herein by reference.

BACKGROUND

Network service providers rely on increasing amounts and varieties of data to manage their networks. Network performance data, alarm data, alert data, event data, log data, live data, hardware data, Internet-of-Things (IoT) data, and many other types of data may be collected throughout a heterogeneous network environment. Many of the data messages generated throughout a network environment have different message formats and/or interfaces, as defined by different vendors or standards. These different message formats and interfaces necessitate different data collection systems across the network, require duplicative data collection functions, and limit the use of a common framework, thus increasing system integration complexity and effort.

DETAILED DESCRIPTION OF EXAMPLE EMBODIMENTS

The following detailed description refers to the accompanying drawings. The same reference numbers in different drawings may identify the same or similar elements. Also, the following detailed description does not limit the invention.

There are many standard defined interfaces for telemetry and analytics subscriptions, yet the number of different interfaces makes it difficult to have a single generalized assurance framework. For example, a network data analytics function (NWDAF) of a Fifth Generation (5G) core network may collect analytics information associated with radio access network (RAN) and/or core network components. It may be inefficient for a Self-Organizing Network (SON) to have to implement a standard-defined interface for the NWDAF simply to have access to and benefit from useful analytics. Similarly, the NWDAF should not need to implement multiple interfaces to collect data from multiple sources. As another example, analytics and assurance applications for Open Radio Access Network (O-RAN) architectures may benefit when analytics information can be collected from functions with non-standard interfaces.

Systems and methods described herein enable data collection and analytics consumption with a generalized assurance framework using a message bus that supports a publish-subscribe (pub-sub) model. The generalized assurance framework simplifies deployment and management of assurance services, increases flexibility to support new assurance use cases with a plug-and-play deployment model, and enables cost efficient procurement of vendor products (e.g., customers may only procure essential components instead of an entire framework).

According to an implementation, a first network element (e.g., a producer) subscribes to a request topic on a message bus and posts, to the message bus, an announcement indicating a data topic is available from the first network element. A second network element (e.g., a consumer) uses the request topic to initiate, via the message bus, production of the topic by the producer. The first network element receives via the message bus, the request topic including a request for the data topic and posts, to the message bus, records for the data topic in response to the request.

Figure 1:
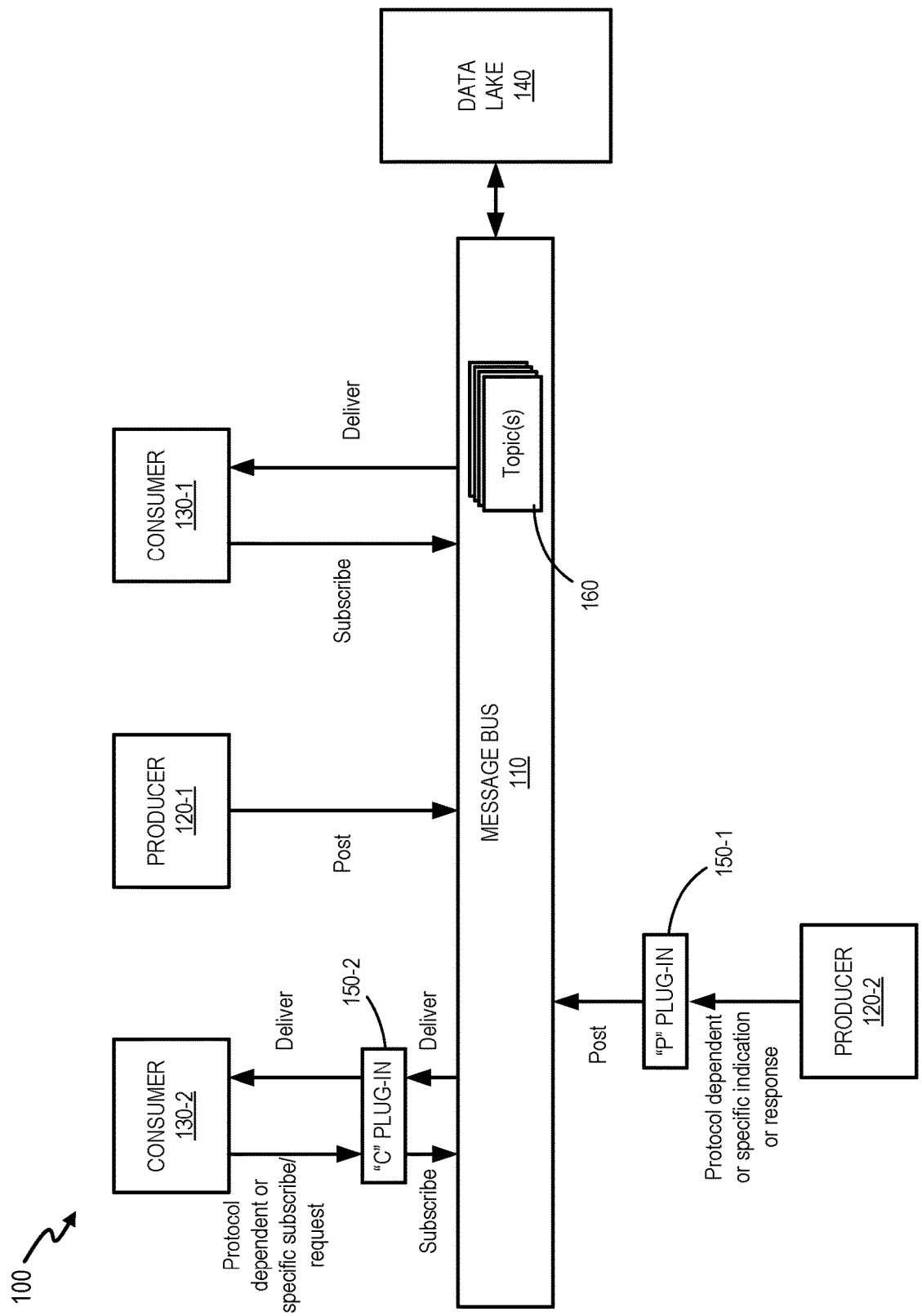
FIG. 1 is a diagram illustrating concepts described herein.

FIG. 1 is a diagram illustrating concepts described herein. As shown in FIG. 1, an environment 100 may include a message bus 110, producers 120-1 and 120-2 (referred to herein collectively as "producers 120" and generically as "producer 120"), consumers 130-1 and 130-2 (referred to herein collectively as "consumers 130" and generically as "consumer 130"), and a data lake 140. Producers 120 and consumers 130 may also be referred to collectively as network elements.

Message bus 110 may receive and distribute messages throughout network environment 100. Message bus 110 may include a Data Movement as a Platform (DMaaP) system that provides a data movement service that transports and processes data from any source (i.e., a "producer") to any target (i.e., a "consumer"). According to different implementations, a DMaaP system may include a message bus using Apache Kafka, Apache Flume, Scribe, Apache Chukwa, or other services. In some implementations, message bus 110 may include a distributed streaming platform that publishes streams of records from producers/contributors to consumers, stores the streams of records in a fault-tolerant durable manner, and processes the streams of records. For example, producers 120 may publish messages to message bus 110 for distribution to one or more consumers 130. Message bus 110 may run as a cluster of one or more servers that store streams of records in categories called topics. Each record in a topic may include, for example, a key, a value, and a timestamp. In message bus 110 (e.g., a Kafka bus), a producer contributes a stream of records to one or more topics (i.e., topics 160). A consumer subscribes to the one or more topics, and selectively retrieves records of subscribed topics for consumption. Accordingly, in the configuration of FIG. 1, a producer 120 may contribute a stream of records for one or more topics 160. A consumer 130 subscribes to the one or more topics 160, and selectively retrieves records of subscribed topics 160 for consumption.

Producer 120 may include a computing device or network device that collects, generates, and/or publishes data to support network analytics, real-time network management, etc. Producer 120 may produce data, insight, or policy. Producer 120 may include for example, a physical network device or a virtual network function. A producer 120 that is configured with an interface for message bus 110 may post records (e.g., under designated topics) directly to message bus 110 for retrieval by subscribing consumers.

Consumer 130 may include a computing device or network device that subscribes to and retrieves data from message bus 110, such as data posted by producer 120. Consumer 130 may include for example, a physical network device or a virtual network function. A consumer 130 may consume data, insights or policies available through message bus 110. An insight consumer may be an actuator or may itself be simply another insight producer. A consumer 130 that is configured with an interface for message bus 110 may retrieve records (e.g., published under subscribed topics) directly from message bus 110.

Data lake 140 may include a database of records posted by producers 120 to message bus 110. According to an implementation, data lake 140 may store data in its native, raw format. At data lake 140, data for each producer 120 may be identified by the data producer name, its Internet Protocol (IP) address, a port associated with the producer, and/or another type of identifier.

Topics 160 may identify categories of information under which producers (e.g., producers 120) may post to message bus 110 and to which consumers (e.g., consumers 130) may subscribe. Topics 160 may include a type of data (e.g., call-drop rate analytics) and a subset (e.g., a geographic region). According to implementations described further herein, new topics 160 are introduced to message bus 110 to build new capabilities on top of a generic message bus framework, such as capabilities to permit on-demand production. A directory may list topics, subsets, production status, etc. Information in the directory may be collected from producer announcements.

Topics 160 may be "remembered" (e.g., cached) by message bus 110 for a limited amount of time before being "forgotten" (e.g., dropped). Consumers 130 subscribe to topics 160, which message bus 110 delivers if/when such topics 160 are available on message bus 110. Producers 120 may not know if posted topics 160 are being consumed, or by how many consumers 130. Also, consumers 130 may not know who is the producer 120 for a particular topic 160. Message bus 110 distributes a topic 160 to all consumers 130 that have subscribed to the topic. Message bus 110 may effectively distribute messages to producers and consumers (e.g., producer 120-1 and consumer 130-1) that support the underlying generic framework of message bus 110. According to implementations described herein, producers and consumers (e.g., producer 120-2 and consumer 130-2) that do not support the underlying generic framework of message bus 110 may use plug-ins 150-1 and 150-2 (referred to generically as plug-ins 150).

To build a generic assurance framework that can incorporate producers 120-2 and consumers 130-2 that do not support the generic message bus 110 framework, implementations described herein build on top of the generic message bus 110 framework without introducing new capability to the message bus 110 itself. Thus, any generic message bus technology can be used. Implementations described herein introduce special producers and subscribers, shown as plug-ins 150 in FIG. 1, on message bus 110. Plug-ins 150 may act as translators for producers 120-2 (e.g., "P" plug-in 150-1) and consumers 130-2 (e.g., "C" plug-in 150-2) that do not support the generic message bus 110 framework, while also providing additional functionality described herein for any type of producer 120 and consumer 130.

For example, implementations described herein provide for on-demand production managed by plug-ins 150, where a producer 120 may only produce a topic 160 if consumers 130 (e.g., subscribers) are subscribed to that topic. However, a producer 120 can also be configured to automatically produce even without subscribers. This on-demand production can preserve network resources, particularly in systems where producers 120 or a collection of producers 120 can generate a large amount of data. On-demand production enables both request-response and subscribe-notify type transactions on message bus 110.

Figure 2:
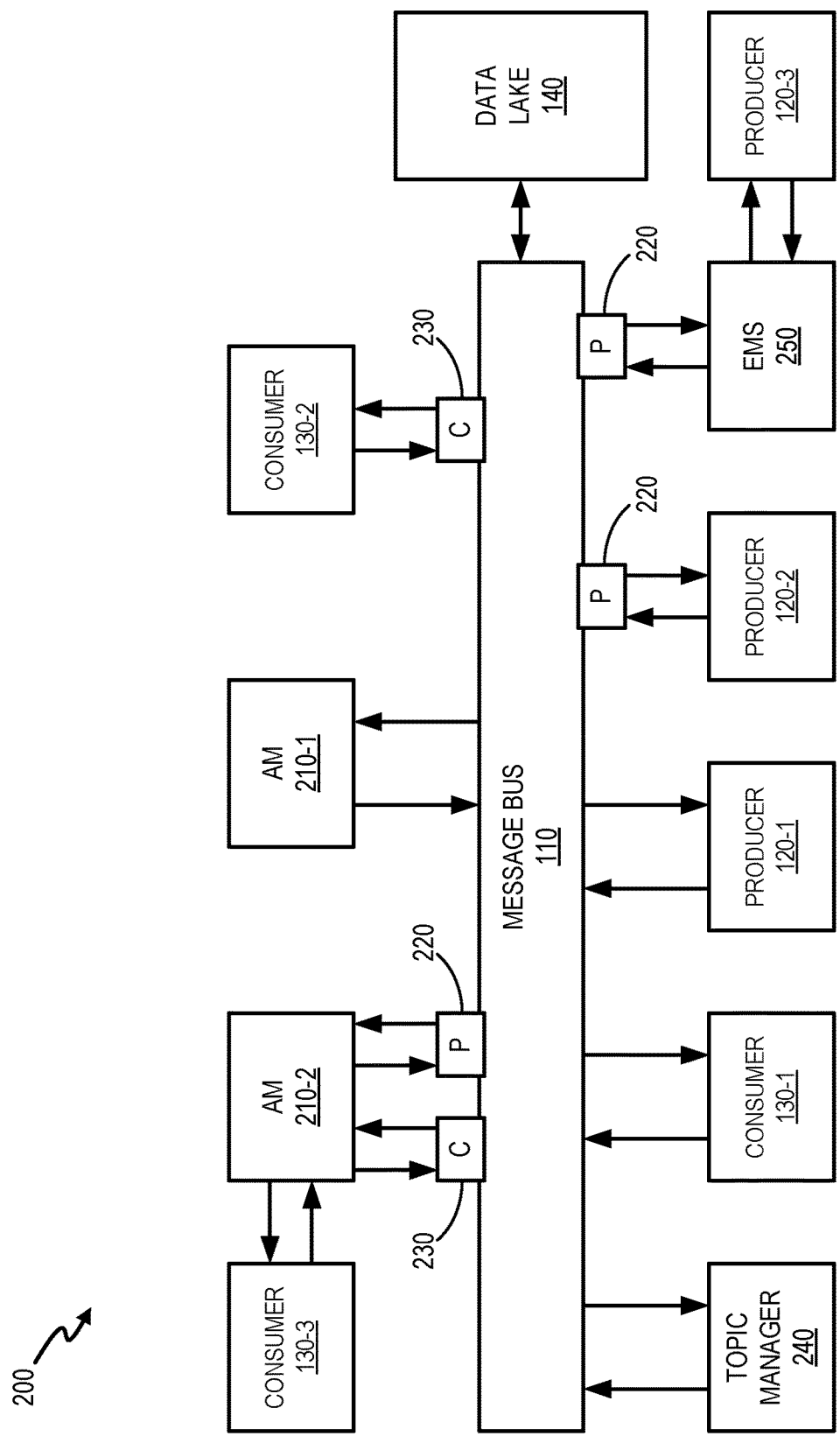
FIG. 2 is a diagram illustrating an exemplary configuration that provides an embodiment of the generic assurance framework described herein.

FIG. 2 is a diagram illustrating an exemplary configuration that may provide an embodiment of a generic assurance framework. As shown in FIG. 2, an environment 200 may include message bus 110, producers 120, consumers 130, and data lake 140, as described above in connection with FIG. 1. Environment 200 may further include assurance modules (AMs) 210-1 and 210-2 (referred to herein collectively as "AMs 210" and generically as "AM 210"), producer plug-ins 220, consumer plug-ins 230, a topic manager 240, and an element management system (EMS) 250. In the configuration of FIG. 2, various plug-ins 220/230 (e.g., to message bus 110) interface with producers 120 and consumers 130 to the common or federated message bus 110.

AM 210 may include a network device that monitors, identifies, and/or maps key performance indicators for a network, such as a telecommunications network. AM 210 may function as an insight producer, an actuator, or both. AM 210 may have roles as both a consumer and a producer.

Producer ("P") plug-ins 220 and consumer ("C") plug-ins 230 may generally correspond to plug-ins 150 of FIG. 1. Producer plug-ins 220 and consumer plug-ins 230 may be implemented as a software module (e.g., code, a microservice, a virtual network function, a program, an applet, etc.). Producer plug-ins 220 and consumer plug-ins 230 may incorporate, or interface with, producers 120 and consumers 130 that do not naturally support the generic framework of message bus 110. Producer plug-in 220 and consumer plug-in 230 are described further in connection with, for example, FIGS. 4A and 4B.

Topic manager 240 may generate and update a topic directory for message bus 110. Topic manager 240 may reside on message bus 110. Topic manager 240 may be implemented as a network function (NF) or virtual NF using a defined interface for message bus 110. In other implementations, functions of topic manager 240 may be provided by message bus 110 itself or data lake 140. However, these implementations may require new capabilities to be supported by message bus 110 or data lake 140. Topic manager 240 is described further in connection with, for example, FIG. 5.

EMS 250 may include a network device to manage the functions and capabilities of network elements, such as network elements in a 5G telecommunications network. EMS 250 may interface with, for example, components of distributed wireless access network, such as a central unit (CU) and/or distributed unit (DU) of a radio access network.

The number and arrangement of network devices and/or network functions in environment 200 are exemplary. According to other embodiments, environment 200 may include additional devices/functions or differently-arranged devices/functions than those illustrated in FIG. 2.

Figure 3:
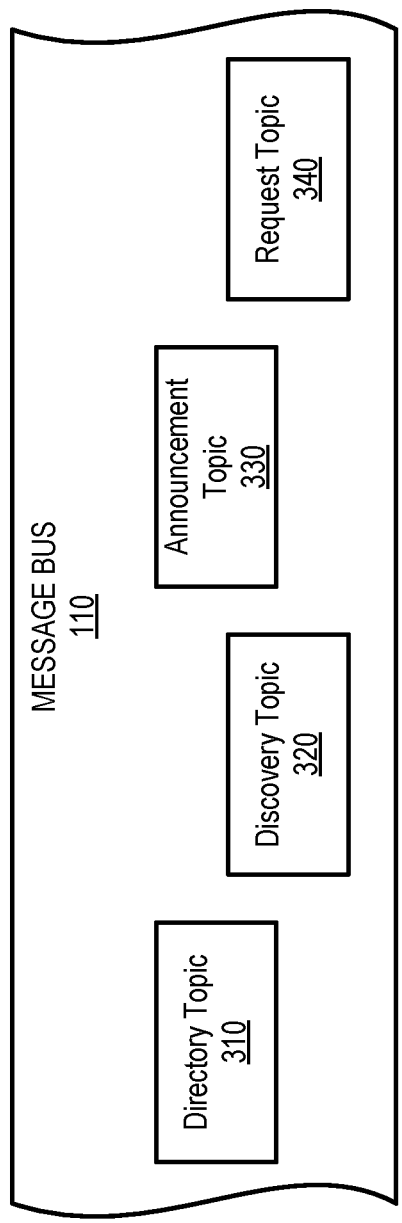
FIG. 3 is a block diagram depicting exemplary message topics for the generic assurance framework of FIG. 2.

FIG. 3 is a block diagram depicting exemplary message topics for the generic assurance framework of environment 200. Topics in FIG. 3 may be a subset of available topics in message bus 110. More particularly, special topics, referred to herein as a directory topic 310, a discovery topic 320, an announcement topic 330, and a request topic 340, may be implemented in message bus 110 to enable, for example, on-demand production.

Directory topic 310 may include a topic or a branch of topics where the branch root can be the top-most level root of the entire topic tree. Directory topic 310 may be, for example, a dedicated topic exclusively for publishing available data topics and their production status. A status is provided for each topic. The status may indicate whether the topic is (a) available but not currently being produced or (b) available and currently in production. For in-production status, a production mode(s), such as a period or trigger, may also be included. For each topic, there may also be attributes describing additional details, such as scope (e.g., a list of tracking areas (TAs)). One-time topics (e.g., a request-response type transaction) can be listed with the status of "available but not currently being produced." Directory topic 310 may be produced (e.g., posted to message bus 110) periodically per configuration. According to an implementation, directory topic 310 may be posted by topic manager 240.

Discovery topic 320 may be posted by a user (e.g., producers 120, consumers 130, plug-in 220/230, etc.) to solicit a "directory" topic (e.g. directory topic 310) being posted. Discovery topic 320 may include a discovery request for a specific topic, or a branch of topics where topics are organized in a tree structure with the top-most level root corresponding to all topics available on message bus 110.

Announcement topic 330 may be used by a producer (e.g., producers 120, plug-in 150, etc.) to announce the availability of a topic or a branch of topics in message bus 110. Each topic in the announcement indicates if the topic is simply available (e.g., corresponding to status (a) above), or available and being produced (e.g. corresponding to status (b) above). For in-production status, a production mode, such as periodic or trigger, may also be included. For each topic, there may also be attributes describing more details such as scope (e.g., a list of TAs). One-time topics (e.g., a request-response type transaction) can be announced with the status of available but not currently being produced.

Request topic 340 may be used by a consumer (e.g., consumers 130, plug-in 150, etc.) to request a topic or branch of topics. Each topic in a request may be accompanied by a set of attributes, such as a period (e.g., a start/end time for subscribe-notify service), a threshold (e.g., value for a threshold crossing notification service), filters (e.g., tracking area, subscription permanent identifier list, tracking area code, etc.), or other topic-specific attributes. A request also may indicate whether it is a one-time request, which corresponds to a request-response type transaction, versus a subscribe-notify transaction. Request topic 340 may also be used to "un-request" what was previously requested (e.g., terminate a previous request).

While FIG. 3 illustrates some particular topics 160 that may be used to facilitate data publication and analytics consumption with a generalized assurance framework, other topics may also be used in message bus 110. In other implementations, some topics may be combined. Thus message bus 110 may include fewer, different, or additional topics than those depicted in FIG. 3.

Figure 4B:
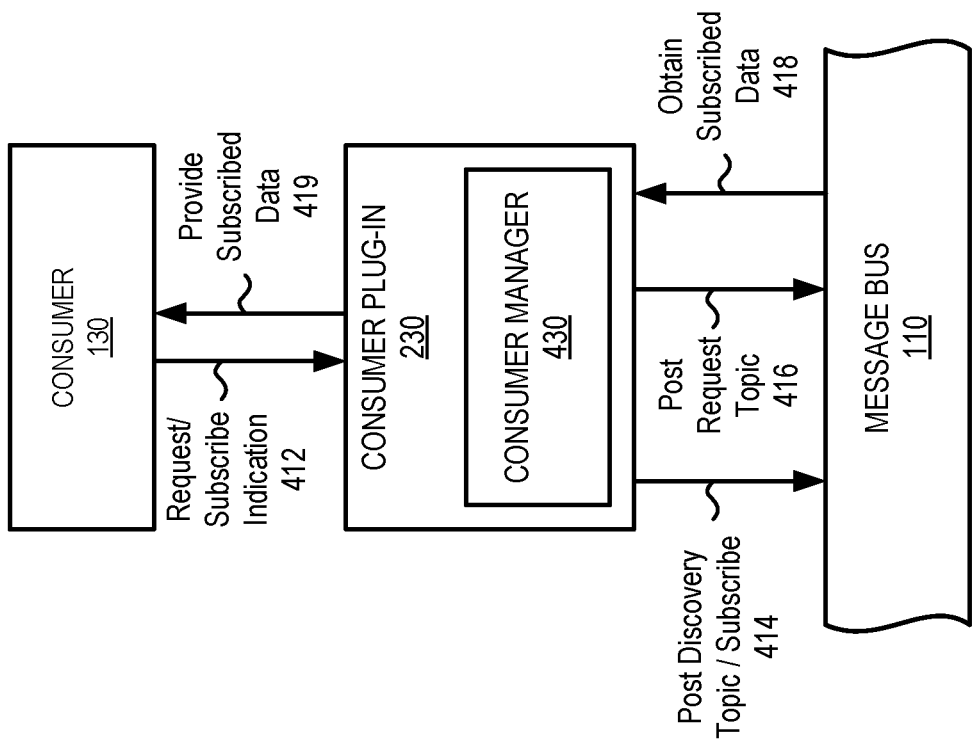
FIG. 4B is a diagram illustrating communications and logical components of the consumer plug-in of FIG. 2.
Figure 4A:
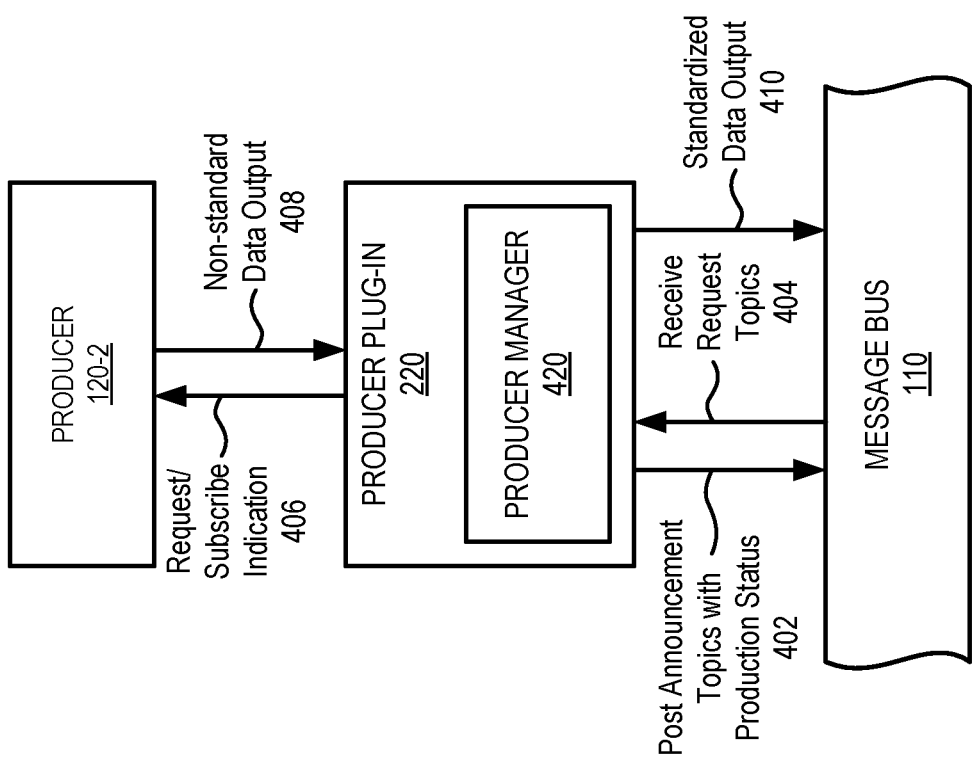
FIG. 4A is a diagram illustrating communications and logical components of the producer plug-in of FIG. 2.

FIG. 4A is a diagram illustrating communications and logical components of producer plug-in 220. Producer plug-in 220 may be used to incorporate producers that do not naturally support the generic framework of message bus 110 (e.g., producer 120-2, referred to herein as a "non-standard producer") into message bus 110. Producer plug-in 220 may perform similar services for other entities that perform a non-standard producer function, such as AM 210-2 and EMS 250.

As shown at reference 402, producer plug-in 220 may post announcement topics 330, along with a corresponding production state, on message bus 110. Since each producer plug-in 220 is specifically designed for a corresponding non-standard producer, producer plug-in 220 identifies what topics can be produced by the non-standard producer. Producer plug-in 220 may announce, for non-standard producer 120-2, a topic that has an active subscription with a status of "available and in production." If a topic produced by non-standard producer 120-2 is un-subscribed (e.g., by all previous consumers), producer plug-in 220 may also provide a non-standard un-subscribe to non-standard producer 120-2, and post an updated announcement topic 220 to message bus 110 to change the status to "available but not in production."

Producer plug-in 220 may subscribe to request topics 340 and turn such request topics 340 into a request or subscribe indication to a corresponding non-standard producer using an interface that non-standard producer 120-2 can process. For example, as indicated at reference 404, producer plug-in 220 may receive a request topic (e.g., request topic 340) via message bus 110. As indicated at reference 406, producer plug-in 220 may convert the request to a non-standard request or subscribe indication for non-standard producer 120-2.

Producer plug-in 220 may also act as a collection point for non-standard producer output (e.g., a response or notification), and post the output of the non-standard producer as a topic on message bus 110. For example, producer plug-in 220 may receive non-standard output 408 from producer 120-2 and convert the non-standard output to standardized output 410, which is posted to message bus 110. According to an implementation, producer plug-in 220 includes a producer manager 420, which keeps track of subscriptions and outstanding responses from non-standard producers.

In some implementations, producer plug-in 220 may also be used by a producer that naturally supports this framework (e.g., producer 120-1 of FIG. 2) to enable on-demand production by posting "announcement" topics, and subscribing to "request" topics. In other implementations, producer 120-1 may also be configured to support these special topics without plug-in 220.

Producer plug-in 220 may also announce what topics its corresponding producer (e.g., non-standard producer 120-2) produces to entities outside the generic framework. For example, producer plug-in for an NWDAF that does not implement a standard service-based interface could also register with a network repository function (NRF) of the analytics ID produced by the NWDAF.

FIG. 4B is a diagram illustrating communications and logical components of consumer plug-in 230. Consumer plug-in 230 may be used to incorporate consumers that do not naturally support the generic framework of message bus 110 (e.g., consumer 130-2, referred to herein as a "non-standard consumer") into message bus 110. Consumer plug-in 230 may perform similar services for other entities that perform a non-standard consumer function, such as AM 210-2 and EMS 250.

According to an implementation both standard consumers (e.g., consumer 130-1) and non-standard consumers (e.g., consumer 130-2) may communicate directly with consumer plug-in 230 as if consumer plug-in 230 were a peer. Consumer plug-in 230 may implement a particular protocol (e.g., the message bus protocol for consumer 130-1 or a protocol shared with the non-standard consumer 130-2). If consumer plug-in 230 is servicing non-standard consumer 130-2, consumer plug-in 230 may use a mapping of requested or subscribed items to topics on message bus 110. If consumer plug-in 230 is servicing standard consumer 130-1, consumer plug-in 230 may post discovery topics 320 or request topics 340, depending on the topic being subscribed by standard consumer 130-1. Consumer plug-in 230 may thus act as a proxy to provide a way for consumers 130 that already support the generic framework (e.g., consumer 130-1) to have access to on-demand topics. Consumer plug-in 230 may include a consumer manager 430 which keeps track of active subscriptions and outstanding requests from corresponding consumers 130.

As shown at references 412 and 414, when receiving a request or subscribe indication from a consumer (e.g., consumer 130-2), consumer plug-in 230 may subscribe to the directory topic 310 (or first post a discovery topic 320 to determine if the topic is available and in production). As shown at reference 416, if the topic is not being produced, consumer plug-in 230 may post a request topic 340 on message bus 110 with the topic(s) which maps to requested or subscribed item(s), along with attributes supplied by the consumer. If the topic is being produced but the specifics do not match that supplied by the consumer (e.g., threshold is different, area of interest is different), consumer plug-in 230 may also posts a request topic 340 on message bus 110. If the topic is being produced (e.g., with matching specifics), consumer plug-in 230 may subscribe to the topic, obtain the data, and return the data to the consumer, as indicated by references 418 and 419.

Although FIGS. 4A and 4B show exemplary communications of producer plug-in 220 and consumer plug-in 230, in other implementations, producer plug-in 220 and consumer plug-in 230 may perform fewer, different, or additional communications than those depicted in FIGS. 4A and 4B.

Figure 5:
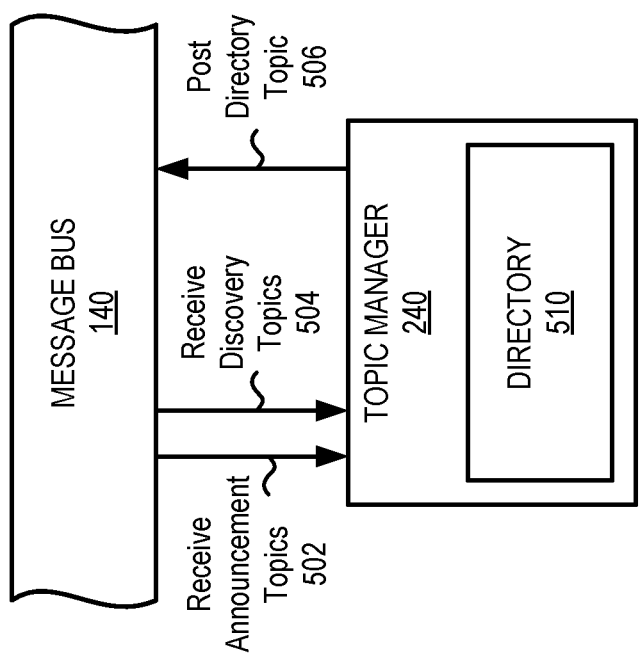
FIG. 5 is a diagram illustrating communications and logical components of the topic manager of FIG. 2.

FIG. 5 is a diagram illustrating communications and logical components of topic manager 240. Topic manager 240 may subscribe to announcement topic 330 and discovery topic 320. Based on posts to announcement topic 330, topic manager 240 may maintain a list of currently available topics in a directory 510. In response to a posted discovery topic 320, topic manager 240 may respond by posting a directory topic 310. According to another implementation, topic manager 240 may be configured to also periodically post directory topic 310. According to different implementations, topic manager 240 may post directory topic 310 with all topics currently being produced or only with a requested topic.

As shown in FIG. 5, topic manager 240 may subscribe to an announcement topic (e.g., announcement topic 330) and a discovery topic (e.g., discovery topic 320) on message bus 110. Topic manager 240 may receive via message bus 110 an announcement 502 (e.g., originating from producer 120 or producer plug-in 220) on announcement topic 340 and update topic directory 510. The announcement may indicate an availability and status for a particular data topic.

Topic manager 240 may also receive via message bus 110 a discovery request 504 (e.g., originating from consumer 130 or consumer plug-in 230) on the discovery topic 310. The announcement may request a particular branch of a topic tree from directory 510 up to the entire directory. Topic manager 240 may, in response, post to message bus 110 all or part of the directory (e.g., corresponding to the scope of the directory request) as a response 506 on directory topic 310. The requesting consumer 130/consumer plug-in 230 (e.g., when subscribed to directory topic 310) may retrieve the directory from message bus 110 and use the directory to subscribe to and/or request a data topic.

Although FIG. 5 show exemplary communications of topic manager 240, in other implementations, topic manager 240 may perform fewer, different, or additional communications than those depicted in FIG. 5.

Figure 6:
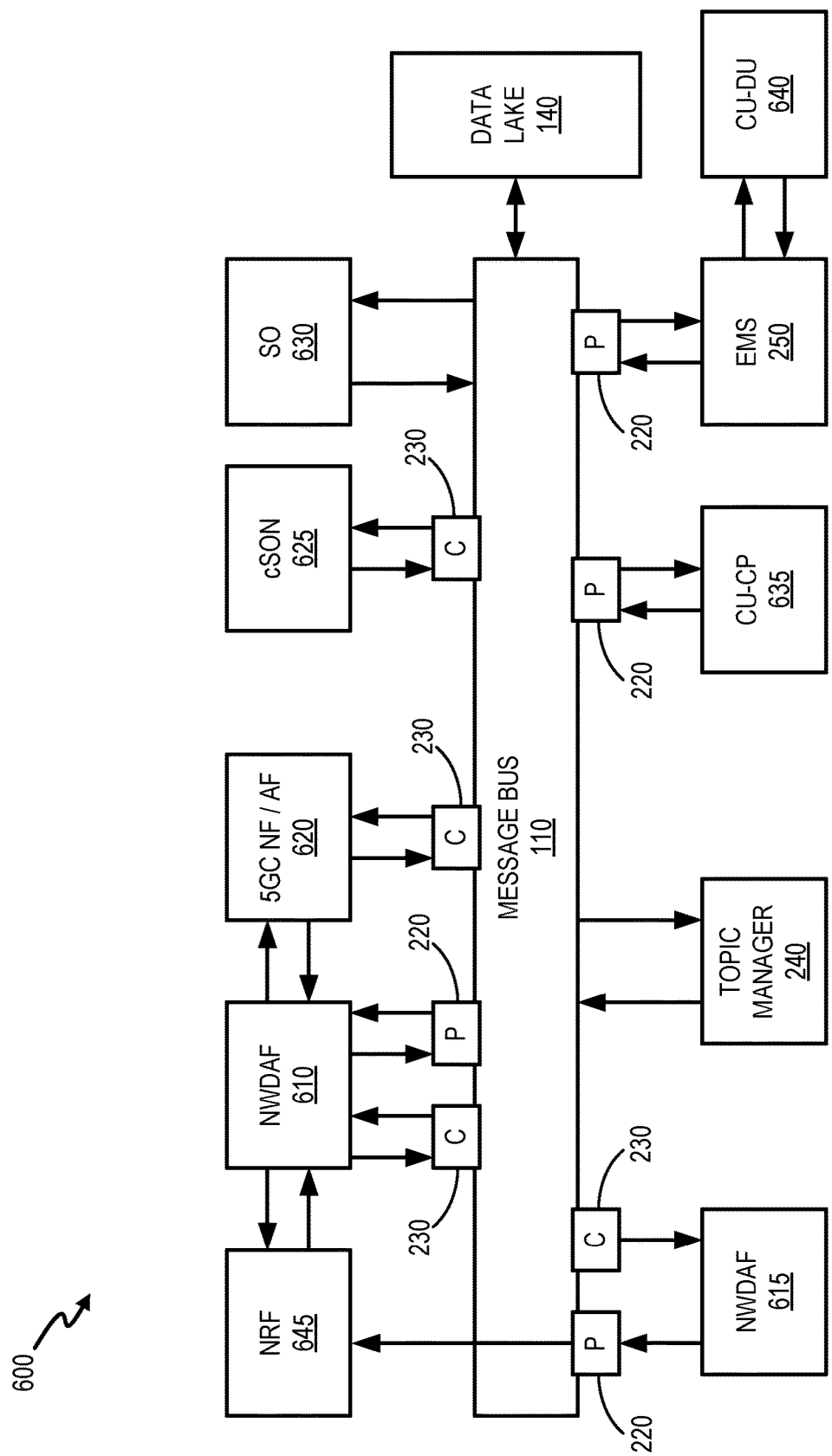
FIG. 6 is a diagram illustrating an exemplary configuration of a generic assurance framework in a Fifth Generation (5G) network environment.

FIG. 6 is a diagram illustrating an exemplary configuration of a generic assurance framework 600 in a 5G network environment. As shown in FIG. 6, framework 600 may include NWDAF 610, NWDAF analytics producer 615, a network function/application function (NF/AF) 620, a central self-organizing network (cSON) 625, a service orchestrator (SO) 630, a central unit-control plane (CU-CP) 635, a central unit-distributed unit (CU-DU) 640, and an NRF 645 each directly or indirectly connected message bus 110.

NWDAF 610 and NWDAF analytics producer 615 may generally correspond to AM 210 of FIG. 2. Generally, each of NWDAF 610 and NWDAF analytics producer 615 may function as both a producer and a consumer in framework 600. NWDAF 610 and NWDAF analytics producer 615 may collect analytics information associated with a RAN and/or core network. For example, NWDAF 610 or NWDAF analytics producer 615 may collect key performance indicators (KPIs) for accessibility (e.g., a radio resource control (RRC) setup success rate, a radio access bearer (RAB) success rate, etc.), retainability (e.g., a call drop rate, etc.), mobility (e.g., a handover success rate, etc.), service integrity (e.g., downlink average throughput, downlink maximum throughput, uplink average throughput, uplink maximum throughput, etc.), utilization (e.g., resource block utilization rate, average processor load, etc.), availability (e.g., radio network unavailability rate, etc.), and/or other types of transport network KPIs. Depending on the implementation, NWDAF 610 and NWDAF analytics producer 615 may generate analytic reports that include unique analytic report identifiers to enable tracking of feedback from consumer NFs (e.g., consumers 130).

In the example of FIG. 6, NWDAF 610 may support 5G core network functions (NFs) and application functions (AFs) over a 3GPP-defined service-based interface (SBI). NWDAF 610 may not directly support communication interface with message bus 110. NWDAF analytics producer 615 may not support a 3GPP-defined SBI, but may support a direct communications interface (e.g., a Kafka interface or another generic communications interface) with message bus 110. Both NWDAF 610 and NWDAF analytics producer 615 may use a producer plug-in 220 and a consumer plug-in 230. NWDAF 610 may use plug-ins 220/230 to provide interface translation (e.g., between a 3GPP-defined SBI and a generic message bus interface 110) and to facilitate on-demand production. NWDAF analytics producer 615 may use plug-ins 220/230, for example, to facilitate on-demand production.

According to an implementation, producer plug-in 220 for NWDAF 610 may include a NF emulator (e.g., an emulator for a 3GPP 5G NF) to receive a "request" topic 340 via message bus 110 and subscribe with NWDAF 610 over the 3GPP SBI. Assuming NWDAF 610 may need data from CU-CP 635 and CU-DU 640, NWDAF 610 may subscribe to associated topics by using consumer plug-in 230 and post "request" topic 340 to have data posted, if necessary.

NWDAF analytics producer 615 may include a network function that produces NWDAF-type analytics without being configured for a 3GPP NWDAF SBI. Consumers that do not support the generic message bus framework (e.g., NF/AF 620) can also use NWDAF analytics producer 615

(which supports the framework) using a consumer plug-in 230. NWDAF analytics producer 615's producer plug-in 220 may also register with NRF 645 with analytics identifiers produced by NWDAF analytics producer 615. Thus, equipment vendors that do not support 3GPP SBI's may provide NWDAF-type analytics in the same manner that other analytics are provided. Producer plug-in 220 for the NWDAF analytics producer 615 can be developed by another vendor or in-house (e.g., such that one such producer plug-in can support all such NWDAF analytics producers).

cSON 625 may support message bus 110, but may still employ a consumer plug-in 220 to manage on-demand production, for example. When cSON 625 subscribes to a topic corresponding to an analytics produced by NWDAF 610 or NWDAF analytics producer 615, the consumer plug-in 230 for cSON 625 may post "request" topic 340 to initiate production.

SO 630 may subscribe to "directory" topic 310 (or first post "discovery" topic 320) to see if the topics needed by an assurance service (in this case consisting of NWDAF 610 or NWDAF analytics producer 615) are available and in production. If not, SO 630 may take further actions to change the output production of NWDAF 610 and/or NWDAF analytics producer 615.

Plug-in chaining may also be used, according to another implementation. For example, producer plug-ins 220 for CU-CP 635 and EMS 250 plug-in may turn a RAN data "request" topic 340 (e.g., from NWDAF analytics producer 615) into a subscribe or request indication for CU-CP 635 and EMS 250. The consumer plug-in 230 of NWDAF analytics producer 615 is chained to the producer plug-in 220 of the RAN nodes. This chaining enables NWDAF analytics producer 615 to not be configured for (and not have to implement) interfaces to the RAN nodes (e.g., CU-CP 635 and EMS 250).

Although FIG. 6 shows exemplary use cases of framework 600, in other implementations, devices in framework 600 may perform fewer, different, or additional communications than those depicted in FIG. 6. Additionally, while NWDAF is given as an implementation example in FIG. 6, other implementations may apply to other generalized assurance/analytics framework. For example, the methods and services described herein can also be applied to an O-RAN architecture as a way to provide a generic framework for analytics and assurance applications defined, for example, by the O-RAN Alliance.

Figure 7:
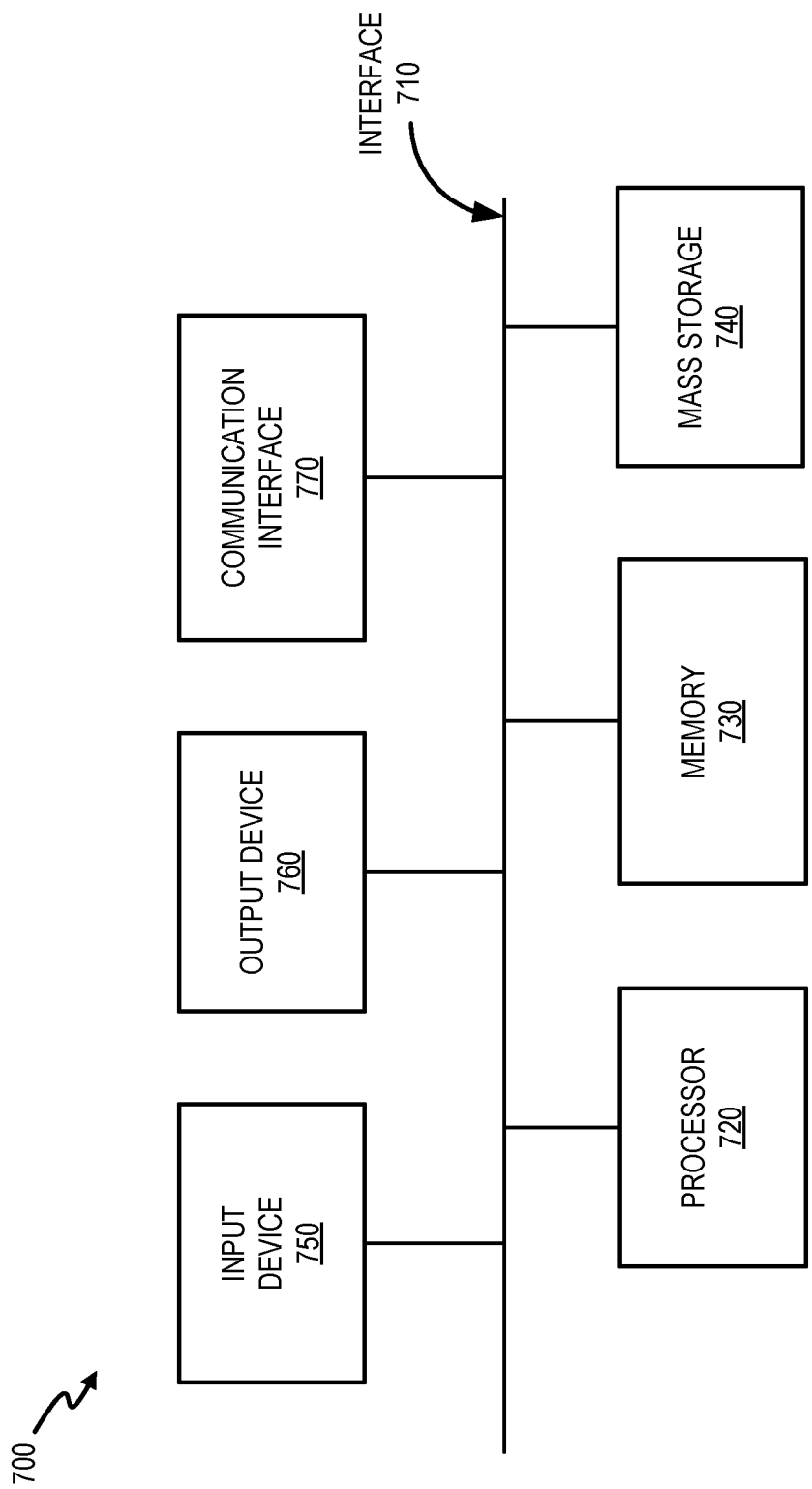
FIG. 7 is a block diagram depicting exemplary components of a device that may correspond to one or more of the devices in FIGS. 1-6.

FIG. 7 is a block diagram depicting exemplary components of a device 700 that may correspond to producer 120, consumer 130, data lake 140, plug-in 150, elements in environment 200, elements in framework 600, or corresponding examples of these network elements. Each of producer 120, consumer 130, data lake 140, plug-in 150, or elements of environment 200 and framework 600 may include one or more devices 700. Device 700 may include an interface 710, a processor 720, a memory 730, mass storage 740, an input device 750, an output device 760, and a communication interface 770.

Interface 710 includes a path that permits communication among the components of device 700. Processor 720 may include any type of single-core processor, multi-core processor, microprocessor, latch-based processor, and/or processing logic (or families of processors, microprocessors, and/or processing logics) that interprets and executes instructions. In other embodiments, processor 720 may include an application-specific integrated circuit (ASIC), a field-programmable gate array (FPGA), and/or another type of integrated circuit or processing logic. For example, the processor 720 may be an x86 based CPU, and may use any operating system, which may include varieties of the Windows, UNIX, and/or Linux. The processor 720 may also use high-level analysis software packages and/or custom software written in any programming and/or scripting languages for interacting with other network entities and providing records to/from, for example, producers 120 and consumers 130 which are communicatively coupled to message bus 110.

Memory 730 may include any type of dynamic storage device that may store information and/or instructions (e.g., software) for execution by processor 720, and/or any type of non-volatile storage device that may store information for use by processor 720. For example, memory 730 may include a RAM or another type of dynamic storage device, a ROM device or another type of static storage device, and/or a removable form of memory, such as a flash memory. Mass storage device 740 may include any type of on-board device suitable for storing large amounts of data, and may include one or more hard drives, solid state drives, and/or various types of redundant array of independent disks (RAID) arrays. Mass storage device 740 may be suitable for storing records associated message bus 110 in data lake 140.

Input device 750, which may be optional, can allow an operator to input information into device 700, if required. Input device 750 may include, for example, a keyboard, a mouse, a pen, a microphone, a remote control, an audio capture device, an image and/or video capture device, a touch-screen display, and/or another type of input device. In some embodiments, device 700 may be managed remotely and may not include input device 750. Output device 760 may output information to an operator of device 700. Output device 760 may include a display (such as an LCD), a printer, a speaker, and/or another type of output device. In some embodiments, device 700 may be managed remotely and may not include output device 760.

Communication interface 770 may include a transceiver that enables device 700 to communicate over communication links with other devices and/or systems. Communications interface 770 may be a wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 770 may include a transmitter that converts baseband signals to RF signals and/or a receiver that converts RF signals to baseband signals. Communication interface 770 may be coupled to one or more antennas for transmitting and receiving RF signals. Communication interface 770 may include a logical component that includes input and/or output ports, input and/or output systems, and/or other input and output components that facilitate the transmission/reception of data to/from other devices. For example, communication interface 770 may include a network interface card (e.g., Ethernet card) for wired communications and/or a wireless network interface (e.g., a Wi-Fi) card for wireless communications. Communication interface 770 may also include a USB port for communications over a cable, a Bluetooth wireless interface, a radio-frequency identification (RFID) interface, a near-field communication (NFC) wireless interface, and/or any other type of interface that converts data from one form to another form.

As described below, device 700 may perform certain operations relating to communications with a generalized assurance framework. Device 700 may perform these operations in response to processor 720 executing software instructions contained in a computer-readable medium, such as memory 730 and/or mass storage 740. The software instructions may be read into memory 730 from another computer-readable medium or from another device. The software instructions contained in memory 730 may cause processor 720 to perform processes described herein. Alternatively, hardwired circuitry may be used in place of, or in combination with, software instructions to implement processes described herein. Thus, implementations described herein are not limited to any specific combination of hardware circuitry and software.

Although FIG. 7 shows exemplary components of device 700, in other implementations, device 700 may include fewer components, different components, additional components, or differently-arranged components than depicted in FIG. 7.

Figure 8:
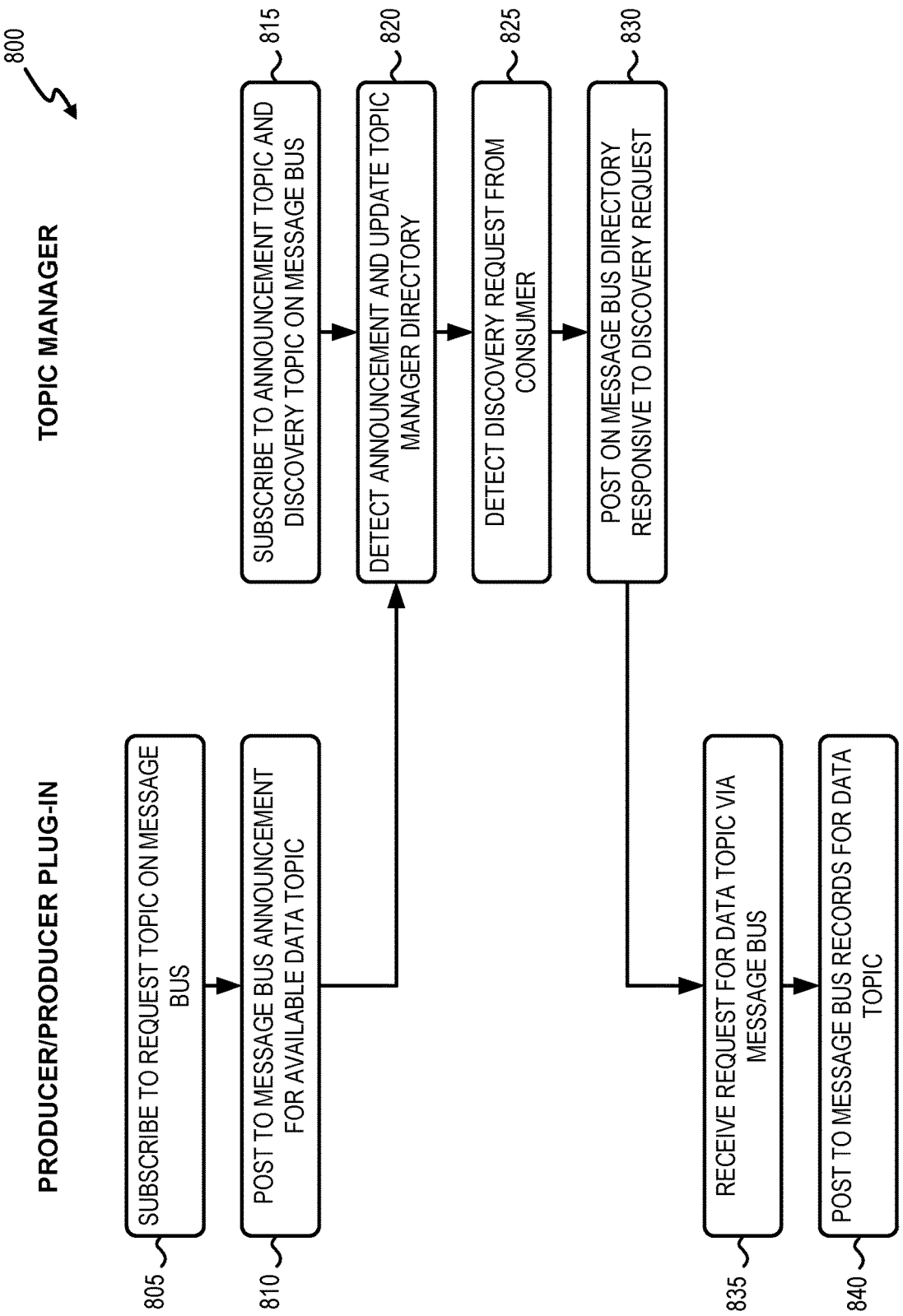
FIGS. 8 and 9 are flow diagrams illustrating exemplary processes for data publication and analytics consumption with a generalized assurance framework, according to implementations described herein.

FIG. 8 is a flow diagram illustrating an exemplary process 800 for data/analytics publication with a generalized assurance framework. According to an implementation, producer 120/producer plug-in 220 and topic manager 240 may perform steps of process 800. In other implementations, some steps of process 800 may be performed in conjunction with consumer 130/consumer plug-in 230.

Referring to FIG. 8, process 800 may include subscribing to a request topic on a message bus (block 805), and posting to the message bus an announcement for an available data topic (block 810). For example, as described in connection with FIG. 4A, a producer 120 and/or producer plug-in 220 may post an announcement topic 330, along with a corresponding production state, on message bus 110. A topic with an active subscription may have a status of "available and in production," while an available topic with no current subscribers may have a status of "available but not in production."

Process 800 may also include subscribing to an announcement topic and discovery topic on the message bus (block 815), and detecting the announcement and updating the topic manager directory (block 820). For example, as described in connection with FIG. 5, topic manager 240 may subscribe to announcement topic 330 and a discovery topic 320 on message bus 110. Topic manager 240 may receive via message bus 110 announcement 502 (e.g., originating from producer 120 or producer plug-in 220) and update topic directory 510. The announcement may indicate an availability and status for a particular data topic.

Process 800 may further include detecting a discovery request from a consumer (block 825), and posting on the message bus a directory responsive to the discovery request (block 830). For example, topic manager 240 may receive via message bus 110 discovery request 504 (e.g., originating from consumer 130 or consumer plug-in 230) on the discovery topic 320. Topic manager 240 may, in response, post to message bus 110 all or part of the directory (e.g., corresponding to the scope of the directory request) as response 506 under directory topic 310. The requesting consumer 130/consumer plug-in 230 (e.g., when subscribed to directory topic 310) may retrieve the directory from message bus 110 and use the directory 510 to subscribe to and/or request a data topic from producer 120.

Process 800 may also include receiving a request for a data topic via the message bus (block 835), and posting, to the message bus, records for the data topic (block 840). For example, as described in connection with FIG. 4A, as indicated at reference 404, producer plug-in 220 may receive request topic 340 via message bus 110, convert the request to a format for producer 120-2, receive non-standard data output from producer 120-2, and convert the non-standard output to standardized output 410, which may be posted to message bus 110.

Figure 9:
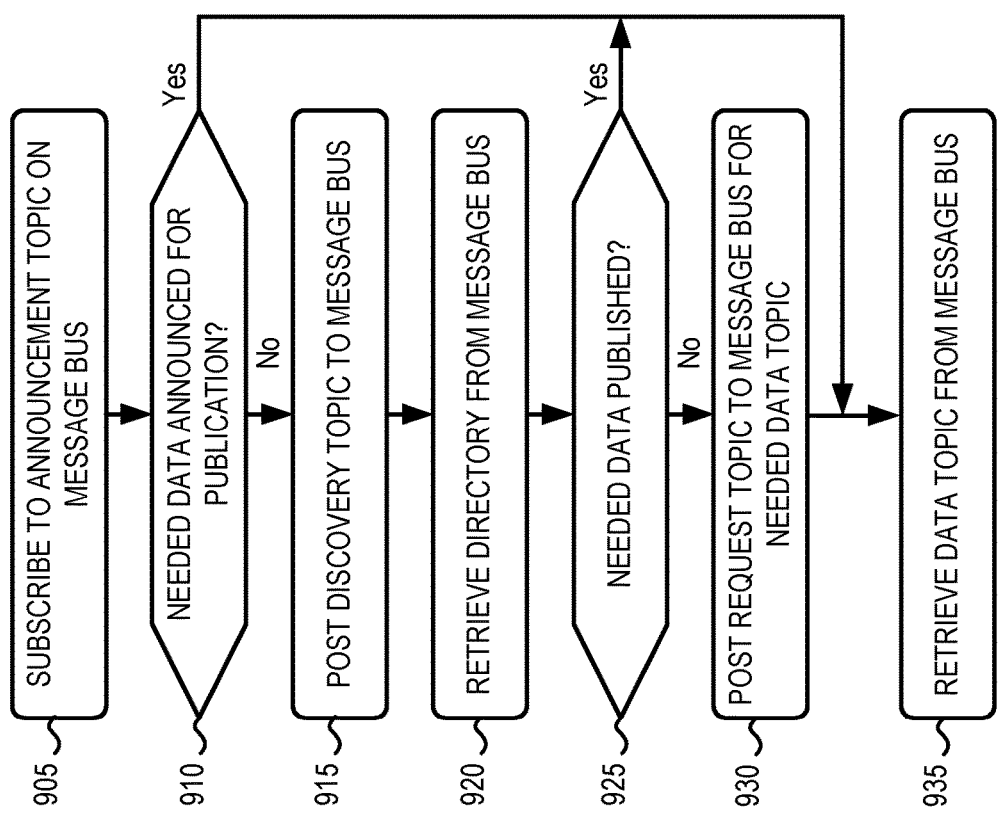

FIG. 9 is a flow diagram illustrating an exemplary process 900 for data/analytics consumption with a generalized assurance framework. According to an implementation, consumer 130/consumer plug-in 230 may perform steps of process 900. In other implementations, some steps of process 900 may be performed in conjunction with producer 120, producer plug-in 220, and/or topic manager 240.

Referring to FIG. 9, process 900 may include subscribing to an announcement topic on the message bus (block 905), and determining if needed data is announced for publication (block 910). For example, a consumer 130 and/or consumer plug-in 230 may subscribe to announcement topic 330 on message bus 110 to determine if there is publication of data needed by consumer 130. Consumer 130/consumer plug-in 230 may monitor traffic on message bus 110 for announcements.

If the needed data is not announced for publication (block 910—No), process 900 may include posting a discovery topic to the message bus (block 915) retrieving the directory from the message bus (block 920), and determining if the needed data is being published (block 925). For example, consumer 130/consumer plug-in 230 may post (using discovery topic 320) a discovery request for a specific topic or a branch of topics. In response to the discovery topic, topic manager 240 may post a directory branch (using directory topic 310) that is responsive to the discovery request. Consumer 130/consumer plug-in 230 may retrieve the directory branch from message bus 110 and determine if the needed data listed in the directory with a status of "available and in production."

If the needed data is not being published (block 925—No), process 900 may include posting to the message bus a request topic for the needed data topic (block 930). For example, consumer 130/consumer plug-in 230 may post a request (using request topic 340) to trigger production of the needed data.

If the needed data is announced for publication (block 910—Yes), if the needed data is being published (block 925—Yes), or after posting the request topic in block 930, process 900 may include retrieving the needed data topic from the message bus (block 935). For example, consumer 130/consumer plug-in 230 as described in connection with FIG. 8, producer 120/producer plug-in 220 may publish a requested data topic to message bus for retrieval by consumer 130/consumer plug-in 230.

Although FIG. 8 illustrates an exemplary process 800 of the generic assurance framework, according to other embodiments, process 800 may include additional operations, fewer operations, and/or different operations than those illustrated in FIG. 8, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. thus, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 720, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 720) of a device. A non-transitory storage medium includes one or more of the storage mediums described in relation to memory 730.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A system comprising:
   a network message bus configured to receive and distribute messages throughout a network; and
   a topic manager configured to:
      subscribe to an announcement topic on the network message bus,
      receive, via the network message bus, an announcement indicating a data topic is available, wherein the announcement is included within the announcement topic,
      store a directory that indicates a status of data topics, including the data topic, on the network message bus, and
      receive, via the network message bus, a discovery request, and
      post, to the network message bus in response to the discovery request, at least a portion of the directory.

2. The system of claim 1, wherein, when posting at least the portion of the directory, the topic manager is further configured to:
   post at least the portion of the directory to the network message bus under a dedicated directory topic.

3. The system of claim 1, wherein the network message bus uses a generic assurance framework, and wherein the system further comprises:
   a producer plug-in interfacing with a first network element that does not support the generic assurance framework, wherein the producer plug-in is configured to post to the network message bus the announcement indicating the data topic is available from the first network element.

4. The system of claim 3, wherein the producer plug-in further comprises:
   a producer communication interface for the first network element, and
   a translator to translate between the producer communication interface and the generic assurance framework.

5. The system of claim 3, wherein the producer plug-in is further configured to:
   subscribe to a request topic on the network message bus,
   receive, via the network message bus, the request topic including a request for the data topic, and
   post, to the network message bus, records for the data topic in response to the request.

6. The system of claim 3, wherein the producer plug-in further comprises:
   a producer manager configured to track, for the first network element, subscriptions and responses received via the generic assurance framework.

7. The system of claim 1, further comprising:
   a consumer plug-in interfacing with a second network element that does not support a generic assurance framework of the network message bus, wherein the consumer plug-in is configured to post to the network message bus a discovery request to identify availability of the data topic.

8. The system of claim 1, wherein the status of the data topics includes:
available but not being produced to the network message bus, or
available and currently in production to the network message bus.

9. The system of claim 1, wherein the network message bus comprises a Data Movement as a Platform (DMaaP) system.

10. A method comprising:
subscribing, by a topic manager, to an announcement topic on a network message bus that is configured to receive and distribute messages throughout a network,
receiving, by the topic manager and via the network message bus, an announcement indicating a data topic is available, wherein the announcement is included within the announcement topic,
storing, by the topic manager, a directory that indicates a status of data topics, including the data topic, on the network message bus,
receiving, by the topic manager and via the network message bus, a discovery request, and
posting, by the topic manager and to the network message bus, at least a portion of the directory in response to the discovery request.

11. The method of claim 10, wherein posting at least the portion of the directory further comprises:
posting at least the portion of the directory to the network message bus under a dedicated directory topic.

12. The method of claim 10, further comprising:
posting, by a producer plug-in and to the network message bus, the announcement indicating the data topic is available from a first network element, wherein the first network element does not support a generic assurance framework of the network message bus.

13. The method of claim 12, further comprising:
subscribing, by the producer plug-in, to a request topic on the network message bus;
receiving, by the producer plug-in and via the network message bus, the request topic including a request for the data topic; and
posting, by the producer plug-in and to the network message bus, records for the data topic in response to the request.

14. The method of claim 10, further comprising:
posting, by a consumer plug-in and to the network message bus, a discovery request to identify for a second network element availability of the data topic, wherein the second network element does not support a generic assurance framework of the network message bus.

15. The method of claim 10, further comprising:
a first network element configured to post, to the network message bus, the announcement indicating the data topic is available from the first network element.

16. The method of claim 10, wherein the network message bus comprises a Data Movement as a Platform (DMaaP) system.

17. The method of claim 10, further comprising:
translating, by a plug-in associated with a second network element, the discovery request.

18. A non-transitory, computer-readable storage medium storing instructions executable by a processor of a topic manager element, which when executed cause the topic manager element to:
subscribe to an announcement topic on a network message bus,
receive, via the network message bus, an announcement indicating a data topic is available, wherein the announcement is included within the announcement topic,
store a directory that indicates a status of data topics, including the data topic, on the network message bus,
receive, via the network message bus, a discovery request, and
post, to the network message bus and in response to the discovery request, at least a portion of the directory.

19. The non-transitory, computer-readable storage medium of claim 18, the instructions to post at least the portion of the directory, when executed, further cause the topic manager element to:
post at least the portion of the directory to the network message bus under a dedicated directory topic.

20. The non-transitory, computer-readable storage medium of claim 18, wherein the status of the data topics include:
not available,
available but not being produced to the network message bus, or
available and currently in production to the network message bus.

* * * * *